Figure 1:
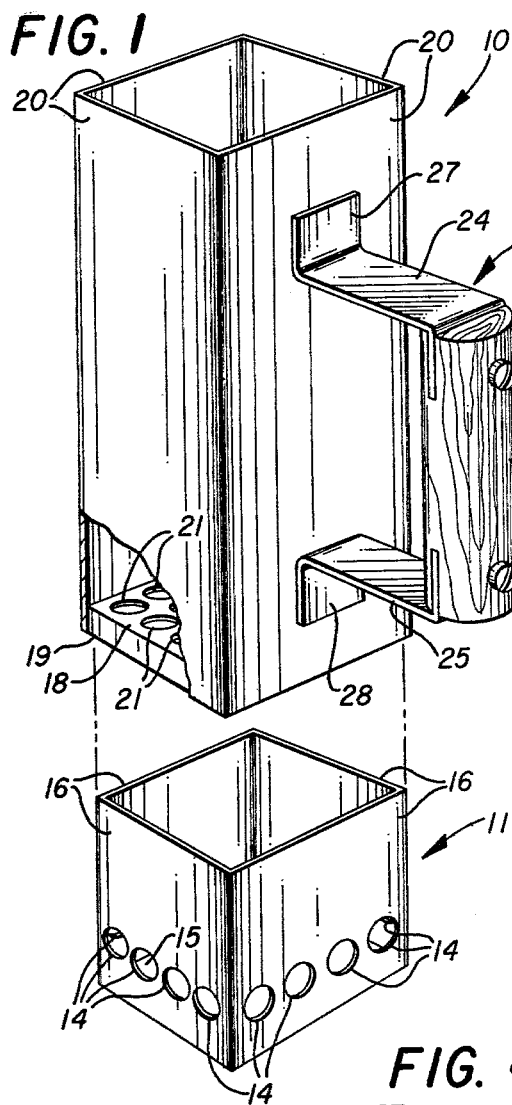

United States Patent [19]

Frazier et al.

[11] 4,227,510
[45] Oct. 14, 1980

[54] CHARCOAL BRIQUET LIGHTER

[76] Inventors: Robert D. Frazier, Triple Acres Ct., Rte. 1, Wayneville, Mo. 65583; Dale E. Duncan, Rte. 1, Box 262, Crocker, Mo. 65452

[21] Appl. No.: 910,666

[22] Filed: May 30, 1978

[51] Int. Cl.³ .............................................. F24B 3/00
[52] U.S. Cl. ................................ 126/25 B; 126/9 R
[58] Field of Search ................. 126/25 B, 9 R, 59.5, 126/9 B, 25 R

[56] References Cited

U.S. PATENT DOCUMENTS

| 3,159,119 | 12/1964 | Hottenroth | 126/25 B |
| 3,765,397 | 10/1973 | Henderson | 126/25 R |
| 3,974,821 | 8/1976 | Storandt | 126/25 B |

Primary Examiner—Carroll B. Dority, Jr.
Assistant Examiner—Lee E. Barrett
Attorney, Agent, or Firm—Warren H. Kintzinger

[57] ABSTRACT

An upright container for the quick light starting of charcoal briquets placed therein. The charcoal briquet holding container that may be filled as much as half way or some more is placed over a bottom metal container containing a crumpled sheet or two of paper. Side openings in the bottom metal container and bottom openings, that are substantially smaller than charcoal briquets, in the bottom plate of the open topped upright container provide for efficient updraft of air and flame from the paper after it is ignited through one of the side openings and efficient burn start ignition of the charcoal briquets.

10 Claims, 6 Drawing Figures

U.S. Patent

Oct. 14, 1980

4,227,510

CHARCOAL BRIQUET LIGHTER

This invention relates in general to outdoor charcoal broilers such as used for charcoal broiling steaks, hot dogs and other foods and, in particular, to a charcoal briquet lighter that efficiently transforms cool unignited charcoal briquets to uniformly the glowing coal state within a very short time of approximately 3 to 5 minutes when they are dumped from the lighter to a charcoal broiler for immediate use in broiling food.

Ignition of charcoal briquets in a charcoal broiler can, many times, be a problem for the user particularly in getting them to a desired uniform glowing coal state ideal for broiling steaks, hot dogs and other foods. In semi-desperation and frustration in getting charcoal properly lighted many people use various highly inflammable fluids as a lighting aid even with the fire hazzards involved and the fact that many such fluids are also toxic in foods. Successful lighting is also time consuming and wasteful of charcoal with excess expense involved with lighting aids and weather many times is also an inhibiting factor. Artifical means such as electric starter elements also present hazard, expense, complexity and starter problems with weather again a factor.

It is, therefore, a principal object of this invention to provide a simple reliable system for starting charcoal briquets for charcoal broilers.

Another object is to minimize the time from initial ignition to transformation of briquets to uniformly glowing charcoal coals ideal for food broiling in a charcoal broiler.

A further object is to eliminate any requirement for dangerous charcoal burn ignition starting aids.

Another object is to achieve more efficient utilization of charcoal in a simple to use reliable charcoal briquet burn starting system.

Features of this invention useful in accomplishing the above objects include, in a charcoal briquet lighter, an upright container, with an exterior handle, that contains charcoal briquets placed therein for quick burn lighting thereof with the container as a charcoal holder filled up to approximately half way. The charcoal holder is placed over a bottom metal container in which a crumpled sheet or two of newspaper, or other paper, has been placed as the initial heat charcoal ignition source for ignition after being lighted by a match. Side openings in the bottom metal container and openings, in a bottom plate of the upright container, that are considerably smaller than charcoal briquets provide for efficient updraft of air and flame from the paper after it is ignited for efficient burn start of charcoal briquets that after a relatively short burn start period of approximately three to five minutes are ready to be dumped into a charcoal broiler ready for broiling food.

Specific embodiments representing what are presently regarded as the best modes of carrying out the invention are illustrated in the accompanying drawing.

Figure 2:
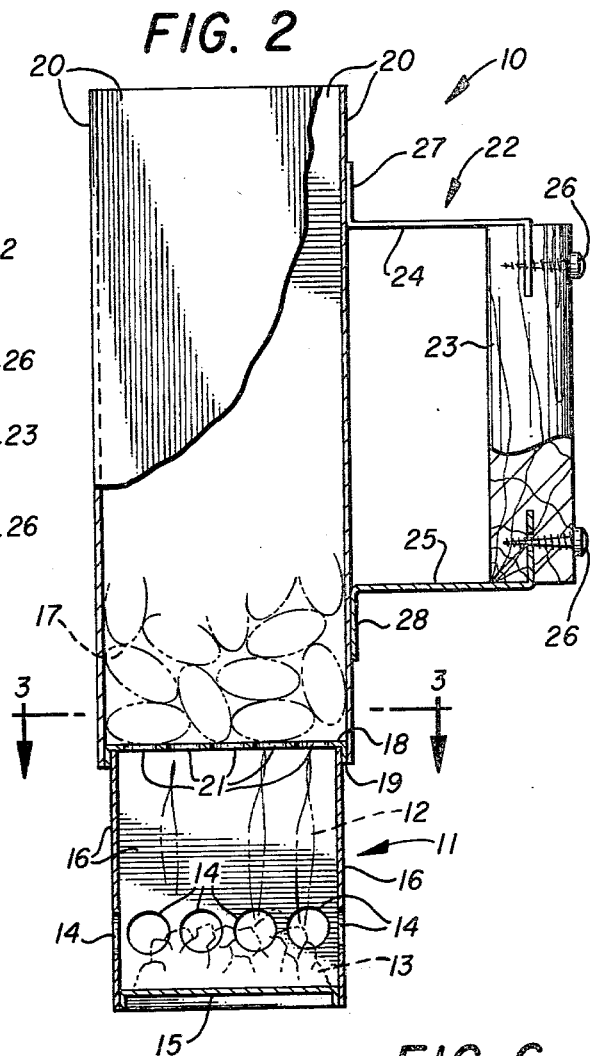
Figure 3:
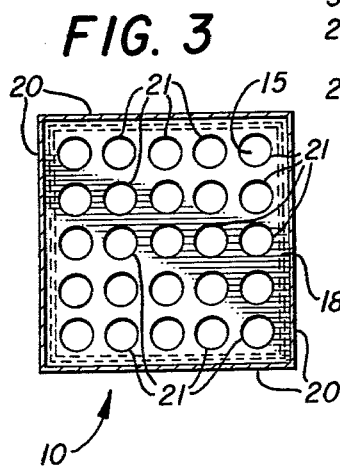
Figure 4:
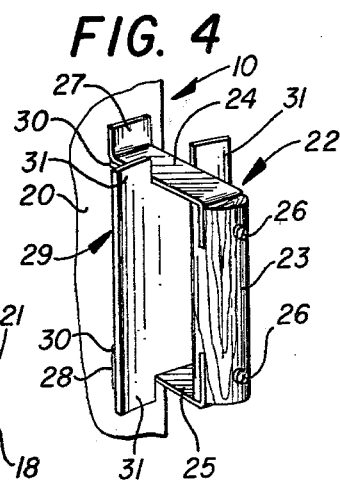
Figure 5:
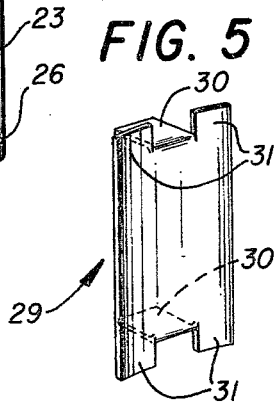
Figure 6:
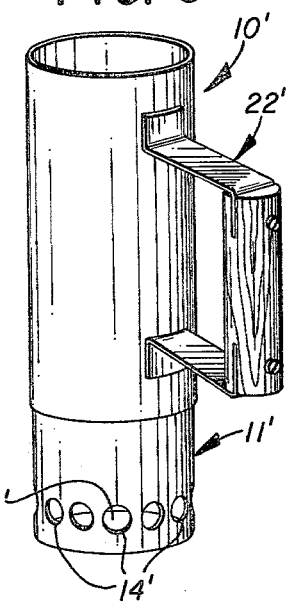

In the drawing:

FIG. 1 represents a perspective view of a charcoal burn start holder lifted up from the base it rests on during the briquet ignition stage;

FIG. 2, a partially broken away and sectioned side elevation view of the charcoal burn start holder of FIG. 1 on its base with charcoal briquets being ignited by heat and flame from burning paper contained within the base unit;

FIG. 3, a view looking down from the line 3—3 of FIG. 2 showing holder bottom plate opening detail;

FIG. 4, a partial perspective view of the handle portion of a holder shown in this instance to also include a heat shield;

FIG. 5, a perspective view of the heat shield of FIG. 4, by itself; and,

FIG. 6, a perspective view of a cylindrical burner start holder and its base usable in place of the rectangular embodiment of FIGS. 1 and 2.

Referring to the drawing:

The rectangular charcoal briquet burn start holder 10 and the base 11 upon which it rests during charcoal burn ignition flaming 12 and from which it is lifted after the charcoal is properly burn started toward the glowing coal state are shown in FIGS. 1 and 2. The rectangular base 11 in which crumpled paper 13, or easily ignited wood chips, are placed is shown to have a plurality of air breather holes 14 positioned relatively low on the sides thereof and a closed bottom plate 15 spaced upward from the bottom of the four sides 16 to afford some measure of protection to the surface the base 11 is resting on and also to, in some measure, reflect heat upward as the paper 13 is burning.

Referring also to FIG. 3 the rectangular base is approximately 5¾ inches wide on a side by approximately 5¾ inches high in sizing optimizing concentration of heat therein developed by burning a relatively small amount of paper and delivery of heat therefrom efficiently to charcoal briquets 17 contained in holder 10 supported on bottom plate 18 that has turned down edges 19 contained within and welded to the sides 20 of the holder 10 that together form a double thickness strengthened lip that fits down on and arond the top of base 11. For proper fit on the top of base 11 the four sides 20 of holder 10 are approximately 6= inches wide on a side and approximately a foot to 16 inches high. This relatively small confined space is also quite ideal for heat containment and efficient burn ignition of charcoal briquets 17 contained therein with initial heat and flame input from burning paper in the base 11 transmitted through the plurality of openings 21 in bottom plate 18. In a matter of approximately some 3 to 5 minutes charcoal briquets, that are considerably larger than the openings 21, are converted from the cool pre-ignited state to the glowing coal state quite efficiently whereupon the holder 10 may be lifted from base 11 and the hot burning coals dumped into a charcoal broiler as desired. This is accomplished by grasping handle 22 to lift the holder 10 with handle 22 constructed of a hand grasping round portion 23 approximately 6 inches long of wood or plastic fastened to upper and lower mounting stand off flange members 24 and 25 by screws 26 with flanges 24 and 25 having base mount bends 27 and 28 welded to a side 20 of the holder 10.

The system is provided with the bottom base 11 made of 22 gauge hot rolled steel, the holder 10 made, typically, of 22 gauge stainless steel capable of withstanding 1,600 degrees fahrenheit, and a handle 23 of a relative non-conductor of heat material. The holder 10 is usually filled to approximately half full or less as desired of charcoal briquets and the only other material required is paper (crumpled one or two sheets) and a match for ignition. The unit achieves proper ignition and burn transformation of charcoal to the glowing coal state reliably with great time savings with required time running to only some three to five minutes. No inflammable or toxic lighting fluids or powders are required in a relatively safe to use long life charcoal igniter. All flammable materials are interwall contained in a unit generally unaffected by foul weather as long as ignition paper in the base remains dry for match lighting. The unit is compact and efficient that optimizes the use of charcoal with minimized waste and cost savings and generally achieves a more even lighting of charcoal than heretofore.

Referring also to FIGS. 4 and 5, a heat shield 29 is also provided, as a further protection for the user, that mounts in the structure of handle 22 with bent in standoff flanges 30 and outer ear extensions 31 to effectively shield side 20 radiated heat from the user's hand that grasps handle 23.

The cylindrical charcoal briquet burn start holder 10' and cylindrical base 11' upon which it rests during ignition are functionally substantially the same as the rectangular embodiment of FIG. 1, with the air breather holes 14' and bottom plate 15' the operational equivalents of breather holes 14 and bottom plate 15. Further, the handle structure 22' that is welded to the side of holder 10' is substantially the same as handle structure 22 and the unit is sized for comparable charcoal briquet capacity and ignition efficiency as attained with the embodiment of FIGS. 1 through 3.

Whereas this invention is here illustrated and described with respect to several specific embodiments hereof, it should be realized that various changes may be made without departing from the essential contributions to the art made by the teachings hereof.

We claim:

1. In a charcoal briquet ligher useful for quick efficient lighting of charcoal briquets in the lighter with the burning briquets then dumped in a broiler for use in broiling food: an open topped upright container, of substantially uniform transverse plane cross-section from top to bottom, having an exterior handle and bottom retaining means with a plurality of openings generally materially smaller than charcoal briquet size; base container means of similar, but slightly smaller, cross-section in the form of a container for ignition starting material having a bottom plate, side breather opening means, and an open top; wherein said base container means is formed with an upper peripheral edge defining said open top; said upper peripheral edge is shaped to be a base support for said open topped upright container upon which said upright container is placeable and from which the upright container is removable; wherein said bottom retaining means is recessed upward from a bottom peripheral edge of said open topped upright container; and with said bottom peripheral edge the terminating end of a relatively short skirt section of said open topped upright container below said bottom retaining means; wherein the relatively short skirt section of said open topped upright container fits over and surrounds the upper peripheral edge of the base container means with said upper peripheral edge in contact with the bottom side of said bottom retaining means when the open topped upright container is in place supported by said base container means; and wherein said bottom plate is recessed upward from a bottom peripheral edge of said base container means to give some protection to the surface supporting the base container means.

2. The charcoal briquet lighter of claim 1, wherein said bottom retaining means is formed with a downward depending peripheral flange welded to the inside of wall means of said open topped upright container to form part of said relatively short skirt section.

3. The charcoal briquet lighter of claim 1, wherein said plurality of openings generally materially smaller than charcoal briquet size are circular openings.

4. The charcoal briquet lighter of claim 3, wherein said breather opening means are a plurality of openings positioned relatively low in side wall means of said base container means.

5. The charcoal briquet lighter of claim 1, wherein said upright container is a cylindrical container; and said base container means is a cylindrical container of less diameter than the diameter of said upright container.

6. The charcoal briquet ligher of claim 1, wherein said upright container is a rectangular container; and said base container means is a rectangular container of smaller dimensions than the dimensions of said upright container.

7. The charcoal briquet ligher of claim 1, wherein said upright container is made of metal constructed to be under approximately eight inches across to optimize reflection of heat and containment of a high percentage of heat in the charcoal briquets for quick efficient relatively even ignition of the briquets.

8. The charcoal briquet lighter of claim 1, wherein said exterior handle includes, a hand grasping portion of relatively non-heat transmitting material, such as wood or plastic; and standoff members fastened to said hand grasping portion and to wall means of said open topped upright container.

9. The charcoal briquet lighter of claim 8, also including a heat shield in the form of a plate mounted in spaced relation to said wall means and generally between said standoff members.

10. The charcoal briquet lighter of claim 9, wherein said heat shield is a metal plate with bent in standoff flanges; and including outer ear extensions extending beyond said standoff members to provide additional protective shielding from radiated heat.

* * * * *